United States Patent [19]

Reck

[11] Patent Number: 4,955,772

[45] Date of Patent: Sep. 11, 1990

[54] CONNECTING ELEMENT

[75] Inventor: Bernhard Reck, Achenbach, Fed. Rep. of Germany

[73] Assignee: EJOT Eberhard Jaeger GmbH & Co. KG, Bad Laasphe, Fed. Rep. of Germany

[21] Appl. No.: 386,736

[22] Filed: Jul. 28, 1989

[30] Foreign Application Priority Data

Jul. 30, 1988 [DE] Fed. Rep. of Germany ... 8809756[U]

[51] Int. Cl.⁵ ............................................. F16B 37/02
[52] U.S. Cl. .................................... 411/175; 411/301; 411/908; 411/900
[58] Field of Search ............... 411/174, 175, 112, 900, 411/901, 908, 301, 302

[56] References Cited

U.S. PATENT DOCUMENTS

| 2,252,904 | 8/1941 | Todd | 411/175 |
| 4,674,931 | 6/1987 | Schwind et al. | 411/175 |
| 4,729,706 | 3/1988 | Peterson et al. | 411/175 |
| 4,798,507 | 1/1989 | Olah | 411/175 |

FOREIGN PATENT DOCUMENTS

| 2518195 | 6/1983 | France | 411/175 |
| 1154713 | 6/1969 | United Kingdom | 411/301 |

*Primary Examiner*—Neill R. Wilson
*Attorney, Agent, or Firm*—Flynn, Thiel, Boutell & Tanis

[57] ABSTRACT

A fastener clip adapted to be mounted onto a substantially plate-shaped carrier and by means of a fastening element is used for fastening of a structural part to the carrier. In order to be able to withstand sufficiently high screwing-in forces by the fastening element and in order to be able to connect the fastening element in a secure manner with the fastener clip, the fastener clip has on its leg a hollow-sleeve portion preferably with a central hole which extends over a length adjusted to the length of the fastening element.

8 Claims, 2 Drawing Sheets

CONNECTING ELEMENT

FIELD OF THE INVENTION

The invention relates to a fastener clip or connecting element comprising a substantially U-shaped clamping part having two legs adapted to straddle a plate-shaped carrier in the area of a fastener receiving hole or not in the carrier.

BACKGROUND OF THE INVENTION

Fastener clips or connecting elements are known from the state of the art and which are used to fasten a structural member by means of a releasable connection to a substantially plate-shaped carrier or a carrier which is constructed plate-shaped at least in the fastening area. Since the plate-shaped carrier usually does not have a sufficient thickness in order to facilitate the construction of a thread and since on the other hand the carrier is often manufactured as a stamped metal part on which, for expense reasons, threads cannot be provided, it has proven to be advantageous to use an additional fastener clip which engages the carrier and which makes possible a fastening by means of a fastening element, for example a screw. Such a fastener clip is constructed according to the state of the art in the form of a clamp-like metal plate, in which metal plate a portion of a thread is provided and into which a screw can be screwed. The disadvantage of this solution is that, on the one hand, the manufacture of such a metal part requires a considerable amount of technology to make it and is therefore very expensive, and that, on the other hand, due to the type of the design of the thread, only small screwin forces can be produced in order to prevent a stripping or destruction of the thread.

Such a metallic fastener clip, which can also be identified as a clamping nut, is usually guided through a hole in the carrier and is clamped to the carrier in the area of a fastener receiving hole at the edge of the hole in the carrier. This operation proves to be particularly work-intensive for the metallic fastener clips, since they have the tendency to jam or to get caught or snagged on the carrier material.

The basic purpose of the invention is to provide a fastener clip or connecting element of the above-mentioned type which with a simple design and simple handling capability makes possible a secure connection of a structural part to a carrier.

The purpose is attained inventively by an elongated hollow-sleeve portion or nut being provided on a first leg of the clip, into which hollow-sleeve portion or nut can be moved a fastening element.

The inventive fastener clip is distinguished by a number of significant advantages. Since a hollow-sleeve portion or nut is provided on the first leg, it is possible to have a screw engage the clip over a sufficient length, so that sufficient forces can be transmitted. Furthermore, the effective length of the hollow-sleeve portion or not substantially increases the resistance to a stripping of the thread, namely, the force which could result in a destruction of the thread area, is substantially reduced. For this reason, it is possible in a particularly advantageous manner to automate the screwing in of a screw into the hollow-sleeve portion or nut. A further advantage of the inventive fastener clip is that same can be manufactured for example of plastic in an advantageous further development, which substantially reduces the production costs. By not needing a specific plastic as a material in particular for the hollow-sleeve portion or nut, a particularly good adaptation to the respective conditions for use can also occur, for example by selecting the friction coefficient to a screw so that a high degree of vibration resistance is assured, namely, the connection does not loosen even in the case of considerable vibrations.

A particular field of use for the inventive fastener clip exists in the field of instrument panels of motor vehicles. The carrier materials which are used thereby are usually manufactured of a thermoplastic material or of a combined phenol-resin wood-fiber material. On such a carrier, it is necessary in order to finish a dashboard to screw the individual elements of the instrument panel to one another. These screw securements must be able to be created easily during installation and may not loosen up during the operation of the motor vehicle. These demands are met advantageously by the inventive fastener clip. It is possible according to the invention to mount the fastener clip in a simple manner and to connect it by using an automated screw-in operation with a screw. In particular when the fastener clip is made of plastic, there exists also the demanded long-term stability such that, in particular with respect to corrosion protection, no additional precautionary measures are needed. Thus, it is possible according to the invention, in particular in a car manufacturing environment, to secure parts of the interior equipment, for example a radio console, the glove compartment, ventilation operating parts and others, in a particularly effective and inexpensive manner.

A further, particularly favorable development of the inventive fastener clip element has on the second leg of the clamping part on the side facing the first leg an annular centering shoulder. The annular centering shoulder makes it possible to center the fastener clip relative to the fastener receiving hole in the carrier in order to prevent the fastener clip from falling off the carrier or changing its association relative to the fastener receiving hole during attachment or detachment of other components to the carrier.

By using plastic as a material for the parts, a weight reduction of approximately 35% is possible in comparison with the fastener clips used according to the state of the art. This is of a very great importance in particular for use in the production of cars. The connection brings about a very high vibration resistance and can thus be mounted without additional securing elements. The state of the art uses partly spring, tooth or washer plates, securement lacquer, glue or ribs on the underside of the screw-head in order to obtain a sufficient vibration resistance.

A very small mounting moment is now needed for installation. From this results also a correspondingly low remaining initial stressing force. This is of particular importance during a screwing together of thermoplastic plastic structural parts, since these have the tendency to creep (relaxation) under the effect of force. In the case of the metal fastener clips according to the state of the art, a high tightening torque must be used in order to obtain a high release moment. Due to the high initial stressing force simultaneously associated therewith, the thermoplastic material relaxes and prevents thus the initial stressing force. The release moment, however, is also reduced with a decreasing initial stressing force and the connection is released automatically with the least dynamics.

The hollow-sleeve portion or nut is supported in the built-in state over a large surface on the lower leg acting against the material of the carrier. A high axial force transmission is thus possible with a simultaneously small contact pressure between the leg and material of the carrier. Small contact pressure means in the case of plastics also small relaxation tendencies.

The fastener clip can be coated during the manufacturing process with a flocking material, so that in the installed state there exists a damping layer between structural part and carrier material or at least the connecting part with leg. A felt strip is glued on in the state of the art, which is expensive and is subjected to the reliability of the installing person. The flocking task can be done by machine.

The hollow-sleeve portion or nut is constructed advantageously substantially cylindrically. It has thereby been proven to be advantageous to provide the hollow-sleeve portion or nut with a smooth wall central hole. The central hole is particularly advantageous with respect to the manufacture of the fastener clip. It is furthermore assured that during a screwing in of a screw as a fastening element, a sufficient wall thickness is available. The central hole prevents the hollow-sleeve portion or nut from tearing open during the screwing in of a screw or from deforming in an unreliable manner.

The second leg has in an advantageous manner a hole therethrough for facilitating a guiding of the fastening element therethrough, so that same is only screwed to the hollow-sleeve portion or nut. However, it is also possible to carry out a screwing in the area of the second leg, in addition to the hollow-sleeve portion or nut.

The first leg and the second leg are initially formed at an acute angle to one another in the not used state in a particularly advantageous further development of the invention. Thus, during an installation onto a plate-shaped carrier a sufficient clamping force is produced as the legs are spread apart in order to hold the connecting element on the carrier. This is particularly also advantageous when the structural part to be connected to the carrier is later removed or the connection is in a partly released state, since then a slipping off of the connecting element is prevented in a secure manner.

In order to make the installation easier, it is possible according to the invention to round off the free ends of the legs and/or to provide them with a chamfer. This substantially facilitates a moving of the fastener clip onto the carrier, in particular getting caught, snagging or jamming is in this manner practically completely prevented.

The inventive fastener clip is in an advantageous manner used in connection with a thread-forming screw, which automatically constructs a thread during a screwing into the hollow-sleeve portion or nut.

In order to increase the damping characteristics between the carrier and the structural part to be connected to same, it can be particularly advantageous to provide a damping layer on the second leg, namely on the leg of the clamping part which is arranged between the structural part and the carrier, or at least to manufacture the second leg of a material with damping characteristics. The providing of an additional damping material, as this is known from the state of the art, where for example felt strips are interpositioned, is not needed in this development. The application of a flocking material to form the damping layer is advantageous.

Thus, it has been proven as particularly advantageous in the case of the inventive fastener clip that the handling can be significantly simplified through a rounding and a chamfering of the free ends of the legs. Furthermore, the fastener clip is at all times centered in a correct manner with respect to the fastener receiving hole by the annular centering shoulder. This and the high resistance to stripping result in a significant increase in the securedness of the installation, which proves to be particularly advantageous when automatic installation systems are used. Since the fastening element, which is for example constructed in the form of a screw, is connected to the hollow-sleeve portion or nut over a large length, a high degree of long-term solidity is assured, namely, the fastener clip remains, even after a large number of load changes, in a state ready for use. Both the favorable production capability, for example, as an injection molded part, and also the simple installation, result in a considerable reduction in cost in comparison to the fastener clip known up to now.

BRIEF DESCRIPTION OF THE DRAWINGS

The invention will be described hereinbelow with reference to one exemplary embodiment and the drawings, in which.

DETAILED DESCRIPTION

Figure 1:
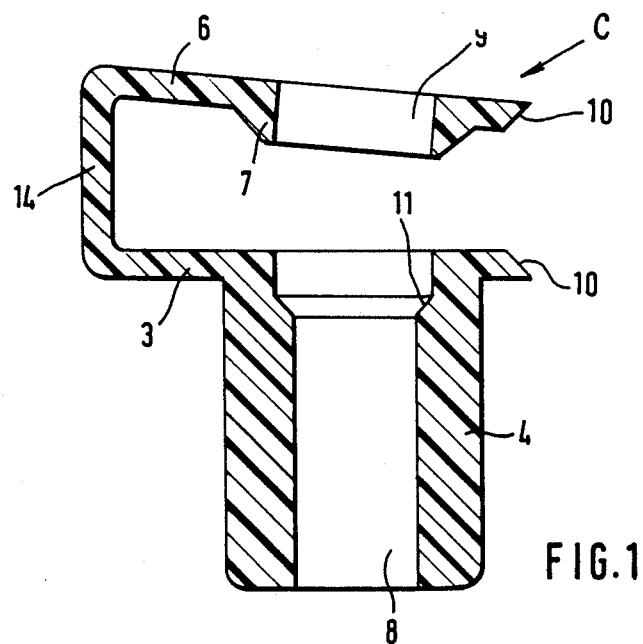
FIG. 1 is a central cross-sectional view of an inventive fastener clip in an uninstalled state.

FIG. 1 shows a cross-sectional view of the inventive fastener clip C. The fastener clip C includes a first leg 3 and a second leg 6 which are constructed substantially plate-shaped and are connected in one piece with one another through a connecting leg 14. The first leg 3, the connecting leg 14 and the second leg 6 together form a substantially U-shaped cross section.

A substantially cylindrical hollow-sleeve portion or nut 4 is provided on the first leg 3, which hollow-sleeve portion or nut 4 extends away from the side of the first leg 3 remote from the second leg 6.

The second leg 6 has an annular centering shoulder 7 on the side facing the first leg 3, which annular centering shoulder is constructed in the form of a toroid or an annular rim.

The first leg 3 and the second leg 6 are, in the unassembled or not in use state illustrated in FIG. 1, initially inclined at an acute angle to one another, and become tensioned when spread apart due to the elasticity of the material during movement onto a carrier 1 (FIG. 3) to develop a clamping force between the two legs 3, 6 to clamp the carrier therebetween.

The second leg 6 has a smooth wall fastener receiving hole 9 therethrough, through which can be guided a fastening element, for example a screw 5. The hollow-sleeve portion or nut 4 has furthermore a smooth wall central bore 8 therethrough corresponding in diameter approximately with the core diameter of the screw 5. The wall thickness of the hollowsleeve portion or nut 4 is sufficient to prevent a tearing open of the hollow-sleeve portion or nut during a screwing in of the screw. A countersunk recess is provided at one end of the bore 8 and a chamfer 11 is provided at the transition area between the countersunk recess and the remainder of the smooth wall central bore 8 in the hollow-sleeve portion or nut 4. The chamfer 11 facilitates the movement of a screw or a fastening element into the central bore 8.

Figure 2:
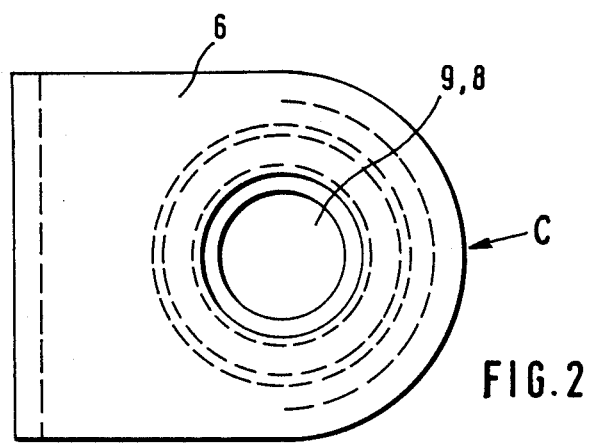
FIG. 2 is a top view of the fastener clip of FIG. 1.

FIG. 2 illustrates a top view of the fastener clip C, from which one can particularly recognize that the free ends of the two legs 3, 6 are rounded semicircularly, in order to facilitate a sliding movement onto the carrier 1. The two legs 3, 6, as shown in FIG. 1, each have mutually facing chamfers 10 on an edge remote from the connecting leg 14 for further facilitating the sliding movement of the legs 3 and 6 onto the carrier 1.

Figure 3:
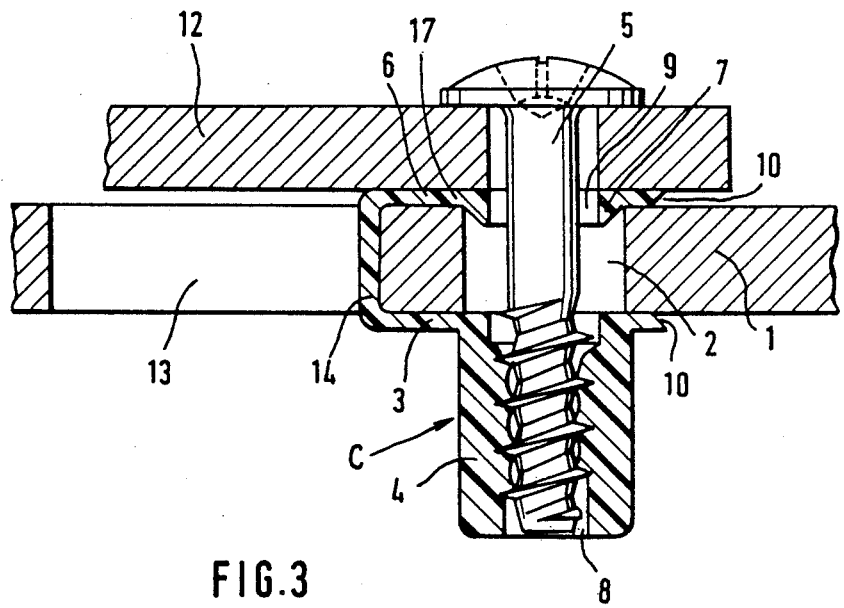
FIG. 3 is a cross-sectional view of the inventive fastener clip in an assembled state.
Figure 4:
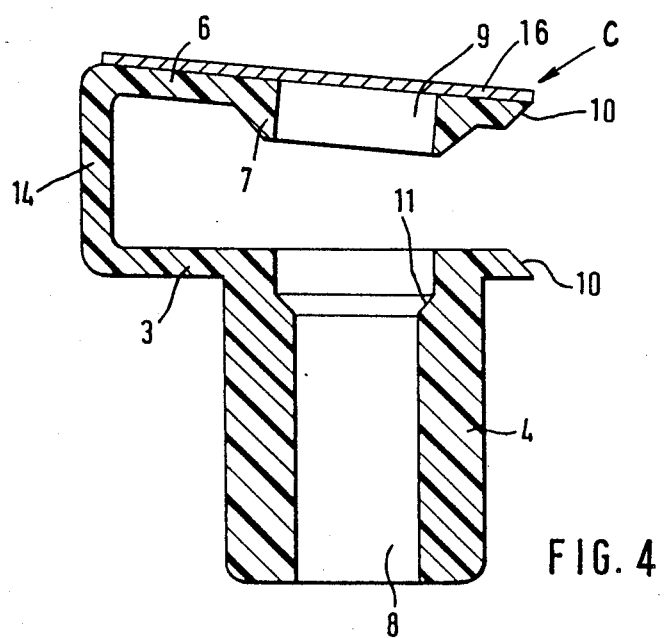
FIG. 4 is a central cross sectional view of a modified embodiment of the fastener clip.

The mounted or assembled state of the inventive fastener clip is illustrated in FIG. 3.

The carrier 1 has a mounting hole 13 extending therethrough, through which the fastener clip C with its first leg 3 and the hollow-sleeve portion or nut 4 can be inserted. A fastener receiving hole 2 also extends through the plate 1 and is located near the mounting hole 13, which recess 2 can be manufactured, for example, in the form of a round hole. The fastener clip C can be moved into the mounting hole 13, and then moved laterally so that the legs 3, 6 spread apart against the elastically yielding force and slide onto and clap the carrier 1 therebetween. The annular centering shoulder 7 of the second leg 6 eventually arrives during a further movement laterally in the fastener receiving hole 2 in order to hold in this manner the fastener clip C in its final position on the plate 1. A rotation of the fastener clip during a screwing in of a fastening element 5 is prevented by the connecting leg 14 resting against the edge of the mounting hole 13. The clamping action between the legs 3, 6 prevents furthermore that the fastener clip is released from the carrier 1 or is moved prior to the fastening element 5 being screwed into the hollow-sleeve portion or nut 4.

After the fastener clip has been moved onto and fixedly positioned on the carrier 1, a structural part 12, which is also provided with a hole therethrough, can be arranged so that its hole is aligned with the axially aligned holes 8 and 9 to facilitate the reception of the fastening element 5 therethrough and into engagement with the interior smooth wall of the hollow-sleeve portion or nut 4.

The exemplary embodiment shows that the second leg 6 can be provided with a damping layer 16. The damping layer 16 can be constructed in the form of a flocking covering the side facing the structural part 12. However, it is also possible to manufacture at least the second leg 6 of a damping material 17.

The invention is not to be limited to the illustrated exemplary embodiment. Instead, many modifications exist within the scope of the invention for the man skilled in the art.

The embodiments of the invention in which an exclusive property or privilege is claimed are defined as follows:

1. In a one-piece plastic fastener clip comprising first and second legs connected together at a common end by a connecting leg to form a substantially U-shaped clamping part adapted to be mounted onto a plate-shaped carrier having means defining a fastener receiving hole therethrough, an elongated sleeve portion, with a centrally located first bore extending therethrough, provided on said first leg of said clamping part, said second leg having a fastener element guiding second bore therethrough generally coaxial with said first bore when said first and second legs extend parallel to one another, the improvement wherein said first bore has a smooth wall surface and is adapted to receive therein a thread-forming fastening element, wherein an annular centering shoulder is provided on said second leg and extends in an encircling relation with said second bore and on a side of said second leg facing said first leg, said annular centering shoulder being of a uniform height dimension around its entire perimeter, and wherein said first bore has a countersunk portion at an end adjacent said second leg tapering through a chamfer at a juncture between said countersunk portion and the remaining portion of said first bore.

2. The connecting element according to claim 1, wherein said hollow-sleeve portion is constructed substantially cylindrically.

3. The connecting element according to claim 1, wherein said first leg and said second leg are initially formed at an acute angle to one another in a not-in-use state.

4. The connecting element according to claim 1, wherein the free ends of said first and second legs are rounded off.

5. The connecting element according to claim 4, wherein said free ends of said first and second legs have a chamfer.

6. The connecting element according to claim 1, wherein at least said second leg is manufactured of a material with damping characteristics.

7. In a one-piece plastic fastener clip comprising first and second legs connected together at a common end by a connecting leg to form a substantially U-shaped clamping part adapted to be mounted onto a plate-shaped carrier having means defining a fastener receiving hole therethrough, the improvement wherein an elongated sleeve portion, with a centrally located first bore extending therethrough, is provided on said first leg of said clamping part, and a fastening element is adapted to be moved into said first bore and be fastened thereto, and wherein a damping layer is provided on said second leg.

8. The connecting element according to claim 7, wherein said damping layer consists of a flocking material.

* * * * *

UNITED STATES PATENT AND TRADEMARK OFFICE
CERTIFICATE OF CORRECTION

PATENT NO.   : 4,955,772
DATED        : September 11, 1990
INVENTOR(S)  : Bernhard RECK It is certified that error appears in the above-identified patent and that said Letters Patent is hereby corrected as shown below:

ABSTRACT, line 1; change "A fastener clip " to
---A connecting element or fastener clip---.

Column 6, line 1; change "fastener clip" to
---connecting element---.

line 40; change "fastener clip" to
---connecting element---.

Signed and Sealed this

Twelfth Day of May, 1992

Attest:

DOUGLAS B. COMER

*Attesting Officer*     *Acting Commissioner of Patents and Trademarks*